(12) United States Patent
Hwang

(10) Patent No.: US 10,122,187 B2
(45) Date of Patent: Nov. 6, 2018

(54) ENERGY STORAGE SYSTEM AND DRIVING METHOD THEREOF

(71) Applicant: SAMSUNG SDI CO., LTD., Yongin-si, Gyeonggi-do (KR)

(72) Inventor: Eui Jeong Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 87 days.

(21) Appl. No.: 15/150,312

(22) Filed: May 9, 2016

(65) Prior Publication Data

US 2016/0336781 A1 Nov. 17, 2016

(30) Foreign Application Priority Data

May 14, 2015 (KR) .................. 10-2015-0067285

(51) Int. Cl.
*H02J 7/00* (2006.01)

(52) U.S. Cl.
CPC .......... *H02J 7/0021* (2013.01); *H02J 7/0019* (2013.01); *H02J 7/0024* (2013.01); *H02J 2007/005* (2013.01)

(58) Field of Classification Search
CPC ...... H02J 7/0018; H02J 7/0021; H02J 7/0022; H02J 7/0024; H02J 7/0081; H02J 2007/0049; H02J 2007/005; H02J 2007/0037; H02J 2007/0039; H02J 7/0052; H02J 7/007; H02J 7/0072; H02J 7/045
USPC .................................. 320/119, 126, 134, 136
See application file for complete search history.

(56) References Cited

U.S. PATENT DOCUMENTS 8,933,667 B2  1/2015  Park et al.
2016/0049813 A1 * 2/2016 Takizawa ............ H01M 10/441
                                                 320/112

FOREIGN PATENT DOCUMENTS

JP   WO 2014155986 A1 * 10/2014 ......... H01M 10/441
KR      2003-0096979 A    12/2003
KR   10-2004-0043318 A     5/2004
KR   10-2012-0107302 A    10/2012

\* cited by examiner

*Primary Examiner* — Richard Isla
*Assistant Examiner* — Michael DiBenedetto
(74) *Attorney, Agent, or Firm* — Lewis Roca Rothgerber Christie LLP

(57) ABSTRACT

An energy storage system including battery packs having a first terminal electrically connected to a first node and a second terminal electrically connected to a second node and configured to receive power from an external device or configured to provide power to the external device through the first and second nodes and a battery management system controlling the battery packs. Each battery pack includes batteries and a transistor unit electrically coupled between the batteries and the first node. The battery management system includes a measuring unit for measuring a state of charge (SOC) of the batteries of each battery pack, and a controller configured to calculate a high value, a low value, an average value, and a difference value between the high and low values from the measured SOCs, and configured to control the transistor units of the battery packs, based on the calculated high, low, average, and difference values.

10 Claims, 4 Drawing Sheets

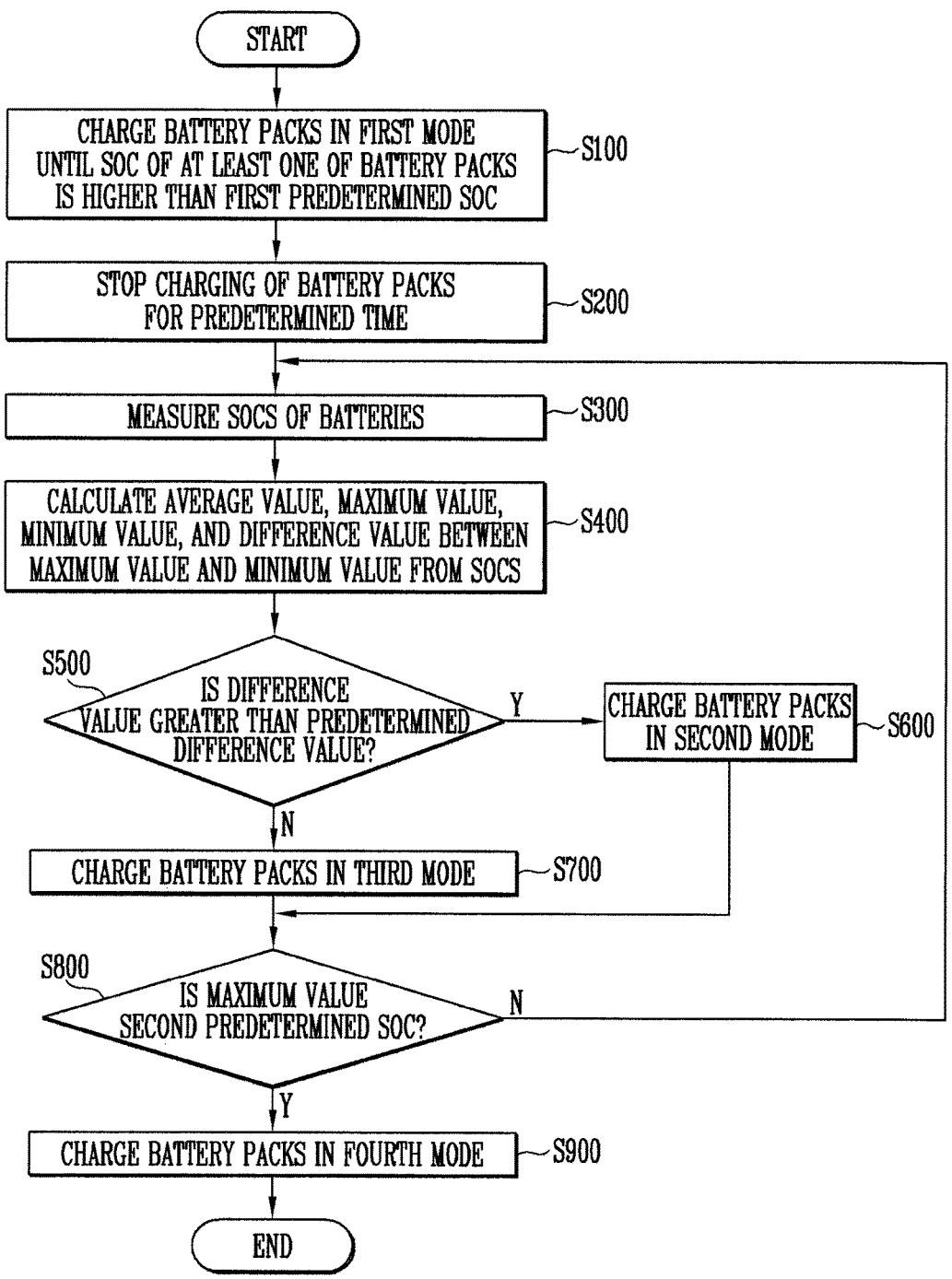

ENERGY STORAGE SYSTEM AND DRIVING METHOD THEREOF

CROSS-REFERENCE TO RELATED APPLICATION

This application claims priority to and the benefit of Korean Patent Application No. 10-2015-0067285, filed on May 14, 2015, in the Korean Intellectual Property Office, the entire contents of which are incorporated herein by reference in their entirety.

BACKGROUND

1. Field

Embodiments of the present invention relate to an energy storage system that can be charged using energy from the external device and a driving method thereof.

2. Description of the Related Art

Recently, batteries have been widely used in not only mobile electronic devices, such as smart phones and tablet PCs, but also vehicles such as cars. Particularly, when a battery is used in a vehicle, a high voltage is used in the vehicle, and hence the battery may be used in the form of a battery pack in which a plurality of batteries are coupled in series to each other. Also, a high charge or energy capacity is useful in the vehicle, and hence the battery may be used in a form in which battery packs are coupled in parallel to each other.

The plurality of battery packs coupled in parallel to each other may be charged or discharged while moving together with the vehicle. Although the battery packs coupled in parallel are concurrently charged or discharged, the states of charge (SOCs) of the battery packs may be different from one another. When the battery packs having different charge states are charged at the same time, one of the batteries may be overcharged. When a lithium-ion battery (Li-ion battery) is overcharged, there may be a risk that the battery will catch fire or explode. The SOC has a value from 0% to 100%. Here, 100% represents a state in which the battery is fully charged, and 0% represents a state in which the battery is completely discharged.

The overdischarge of each battery pack may be prevented or substantially prevented by measuring a SOC of each battery pack, and by controlling current such that the SOC of each battery pack is not changed. However, the number of components used for current control increases, and therefore, price increases.

SUMMARY

Embodiments provide an energy storage system and a driving method thereof, in which the presence of charge, the level of current in charging, and the presence of discharge (with respect to each battery pack) are individually controlled, and a difference value between the SOCs of the battery packs is maintained to a reference difference value or less, thereby preventing or substantially preventing overdischarge.

According to an embodiment of the present invention, there is provided an energy storage system, including: battery packs each having a first terminal electrically connected to the first node and a second terminal electrically connected to the second node, the battery packs each being configured to receive power from an external device or configured to provide power to the external device through the first node and the second node; and a battery management system configured to control the battery packs, wherein each battery pack includes batteries and a transistor unit electrically coupled between the batteries and the first node, and wherein the battery management system includes a measuring unit for measuring a state of charge (SOC) of the batteries of each battery pack, and a controller configured to calculate a high value, a low value, an average value, and a difference value between the high value and the low value from the measured SOCs, and configured to control the transistor units of the battery packs, based on the calculated high, low, average, and difference values.

The transistor unit may include: a first transistor; a second transistor, electrically coupled in series to the first transistor between the batteries and the first node; a third transistor; and a resistor electrically coupled in series to the third transistor between the batteries and the first node, wherein the first and third transistors are respectively configured to electrically connect or electrically disconnect from the first node to the batteries via a first current path and a third current path, and the second transistor is configured to electrically connect or disconnect current from the batteries to the first node via a second current path, wherein the battery management system is configured to transmit first to third control signals respectively to gate electrodes of the first to third transistors, and wherein a level of current flowing in the first current path is greater than a level of current flowing in the third current path when current is flowing in both the first current path and the third current path.

The controller may be configured to generate a charge prohibition signal to stop charging of the battery packs when the high value is greater than or equal to a first reference SOC, and the difference value may decrease for a set amount of non-charging time when the battery packs are not charged.

The transistor unit corresponding to the batteries of the battery pack having a SOC higher than the average value may be configured to be controlled differently from the transistor unit corresponding to the batteries of the battery pack having a SOC less than or equal to the average value when the difference value is greater than a reference difference value after the set amount of non-charging time elapses, and all of the transistor units of the battery packs may be configured to be controlled the same when the difference value is less than or equal to the reference difference value after the set amount of time elapses. The transistor unit corresponding to the batteries having a SOC corresponding to a second reference SOC may be configured to be controlled differently than the transistor units corresponding to the batteries having a SOC lower than the second reference SOC when the high value is greater than or equal to the second reference SOC. The second reference SOC may be higher than the first reference SOC.

When the difference value is greater than the reference difference value after the set amount of non-charging time elapses, the first transistor may be turned off and the second and third transistors may be turned on in the transistor unit corresponding to the batteries having the SOC that is higher than the average value, and the first and second transistors may be turned on and the third transistor may be turned off in the transistor unit corresponding to the batteries having the SOC that is less than or equal to the average value. When the difference value is less than or equal to the reference difference value after the set amount of non-charging time elapses, the first and second transistors of the battery packs may be turned on, and the third transistors of the battery packs may be turned off. When the high value is greater than or equal to the second reference SOC, the first and third transistors may be turned off and the second transistor may be turned on in the transistor unit corresponding to the batteries having the SOC that is greater than or equal to the second reference SOC, and the first transistor may be turned off and the second and third transistors may be turned on in the transistor unit corresponding to the batteries having the SOC that is lower than the second reference SOC.

According to an embodiment of the present invention, there is provided a method of driving an energy storage system including battery packs each of the battery packs including batteries and a transistor unit electrically coupled between the batteries and a first node; and a battery management system configured to measure a state of charge (SOC) of each battery of the battery packs and configured to control the battery packs, the method including: charging the battery packs in a first mode until one of the battery packs having a highest SOC reaches a first reference SOC; measuring the SOCs of the battery packs; calculating the high value, a low value, an average value, and a difference value between the high value and the low value from the measured SOCs; charging the battery packs in a second mode when the difference value is greater than a reference difference value; and charging the battery packs in a third mode when the difference value is less than or equal to the reference difference value.

The method may further include stopping the charging of the battery packs for a set amount of non-charging time after the charging of the battery packs in the first mode and before the measuring the SOCs of the battery packs such that current may not flow into the battery packs from an external device, and such that the difference value may decrease.

The method may further include controlling the transistor units of all of the battery packs the same during the charging the battery packs in the first mode; controlling the transistor units of all of the battery packs the same during the charging the battery packs in the third mode; and controlling the transistor unit corresponding to the batteries having a SOC higher than the average value differently than the transistor unit corresponding to the batteries having a SOC less than or equal to the average value. The transistor unit may include a first transistor; a second transistor electrically coupled in series to the first transistor between the batteries and the first node; a third transistor; and a resistor electrically coupled in series to the third transistor between the batteries and the first node. The first and third transistors may be respectively configured to connect or disconnect current from the first node to the batteries via a first current path and a third current path, and the second transistor may be configured to connect or disconnect current from the batteries to the first node via a second current path The method may further include turning on the first and second transistors and turning off the third transistor during the charging the battery packs in the first mode; turning the first transistor off and turning the second and third transistors in the transistor units corresponding to the batteries having the SOC higher than the average value, and turning on the first and second transistors and turning off the third transistor in the transistor units corresponding to the batteries having the SOC less than or equal to the average value, during the charging the battery packs in the second mode; and turning on the first and second transistors and turning off the third transistors during the charging the battery packs in the third mode.

The method may further include charging the battery packs in a fourth mode when the high value is a second reference SOC; and turning on the first and third transistors and turning on the second transistor in the transistor units corresponding to the batteries having the second reference SOC, and turning off the first transistor and turning on the second and third transistors in the transistor units corresponding to the batteries having the SOC lower than the second reference SOC, during the charging the battery packs in the fourth mode. The second reference SOC may be higher than the first reference SOC.

In the energy storage system and the driving method thereof according to the present invention, the presence of charge, the level of current in charging, and the presence of discharge are individually controlled with respect to each battery pack, and a difference value between the SOCs of the battery packs is maintained to a reference difference value or less, thereby preventing or substantially preventing overdischarge.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements (or components) may also be present. Like reference numerals refer to like elements (or components) throughout.

FIG. 4 is a flowchart illustrating a method of driving an energy storage system according to an embodiment of the present invention.

DETAILED DESCRIPTION

Figure 1:
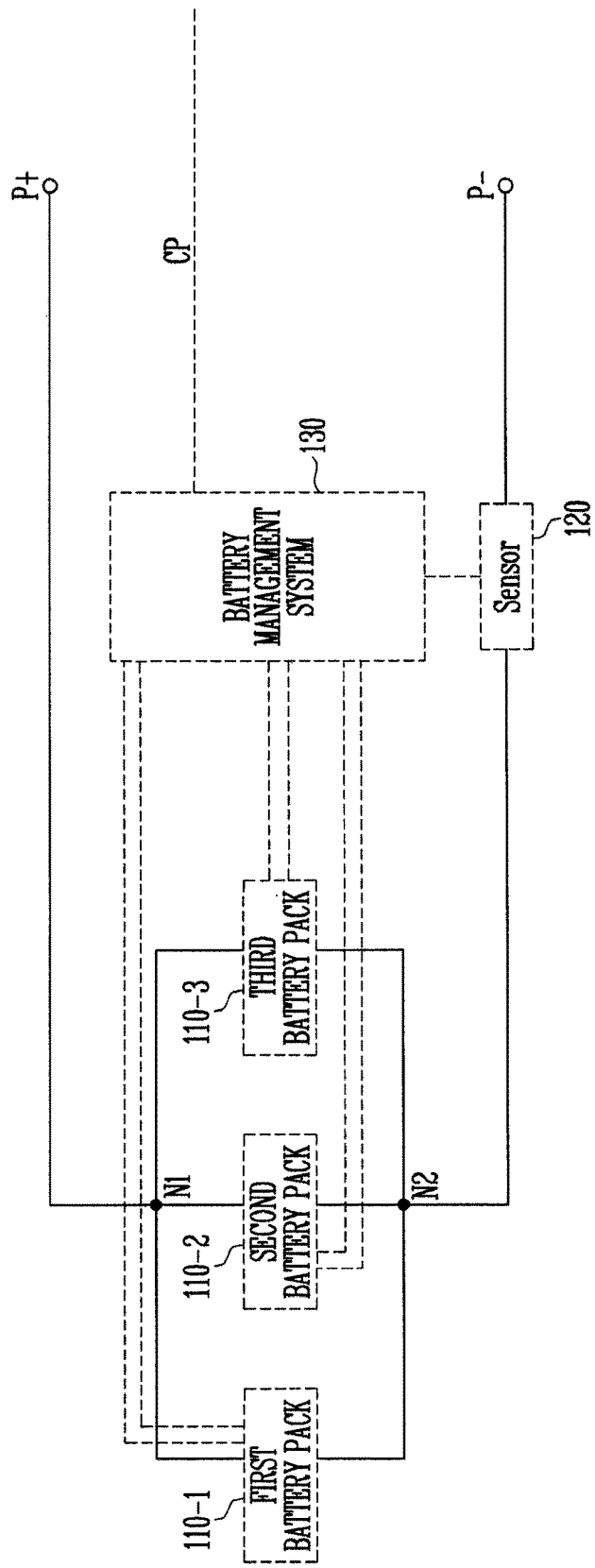
FIG. 1 is a diagram illustrating an energy storage system according to an embodiment of the present invention.

Hereinafter, exemplary embodiments of the present invention will be described in detail with reference to the accompanying drawings. Throughout the specification, like reference numerals denote like components. Hereinafter, the detailed description of related known functions or configurations that may unnecessarily obscure the subject matter of embodiments of the present invention, when describing embodiments of the present invention, may be omitted. Names of components used in the following description are selected in consideration of ease of specification preparation, and thus may be different from names of components used in practical products.

It will be understood that, although the terms "first", "second", "third", etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer, or section discussed below could be termed a second element, component, region, layer, or section, without departing from the spirit and scope of the present invention.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Further "connection," "connected," etc. may also refer to "electrical connection," "electrically connect," etc. depending on the context in which they are used as those skilled in the art would appreciate. When an element or layer is referred to as being "directly on," "directly connected to," "directly coupled to," "directly connected with," "directly coupled with," or "immediately adjacent to" another element or layer, there are no intervening elements or layers present.

As used herein, the terms "use," "using," and "used" may be considered synonymous with the terms "utilize," "utilizing," and "utilized," respectively.

The battery management system and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the battery management system may be formed on one integrated circuit (IC) chip or on separate IC chips. Further, the various components of the battery management system may be implemented on a flexible printed circuit film, a tape carrier package (TCP), a printed circuit board (PCB), or formed on a same substrate as one or more circuits and/or devices of the Energy storage system. Further, the various components of the battery management system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

FIG. 1 is a diagram illustrating an energy storage system according to an embodiment of the present invention.

Referring to FIG. 1, the energy storage system according to the present embodiment includes first to third battery packs 110-1 to 110-3 (hereinafter, collectively referred to as first to third battery packs 110), a sensor 120, and a battery management system 130.

First and second terminals of each of the first to third battery packs 110 are respectively electrically coupled to a first node N1 and to a second node N2. Each of the first to third battery packs 110 is supplied (or charged) with power from an external device, or provides (or discharges) power to the external device through a first terminal P+ that is electrically coupled to the first node N1 and through a second terminal P− that is electrically coupled to the second node N2. The structure of each battery pack 110 will be described in detail below with reference to FIG. 2.

The sensor 120 is electrically coupled between the second node N2 and the second terminal P− to measure a level of total current flowing between the second node N2 and the second terminal P−, and to transmit the measured level of the total current to the battery management system 130. In FIG. 1, the sensor 120 is electrically coupled between the second node N2 and the second terminal P−. However, in other embodiments, the sensor 120 may be electrically coupled between the first node N1 and the first terminal P+.

The battery management system 130 is configured to control the battery packs 110. The battery management system 130 may control charging, the degree of charging, and/or discharging with respect to each battery pack 110. The battery management system 130 is configured to receive a level of total current from the sensor 120. When the battery packs 110 satisfy a given parameter or condition, the battery management system 130 may generate a charge prohibition signal, and may transmit the generated charge prohibition signal to the external device. The structure of the battery management system 130 will be described below in detail with reference to FIG. 3.

Figure 2:
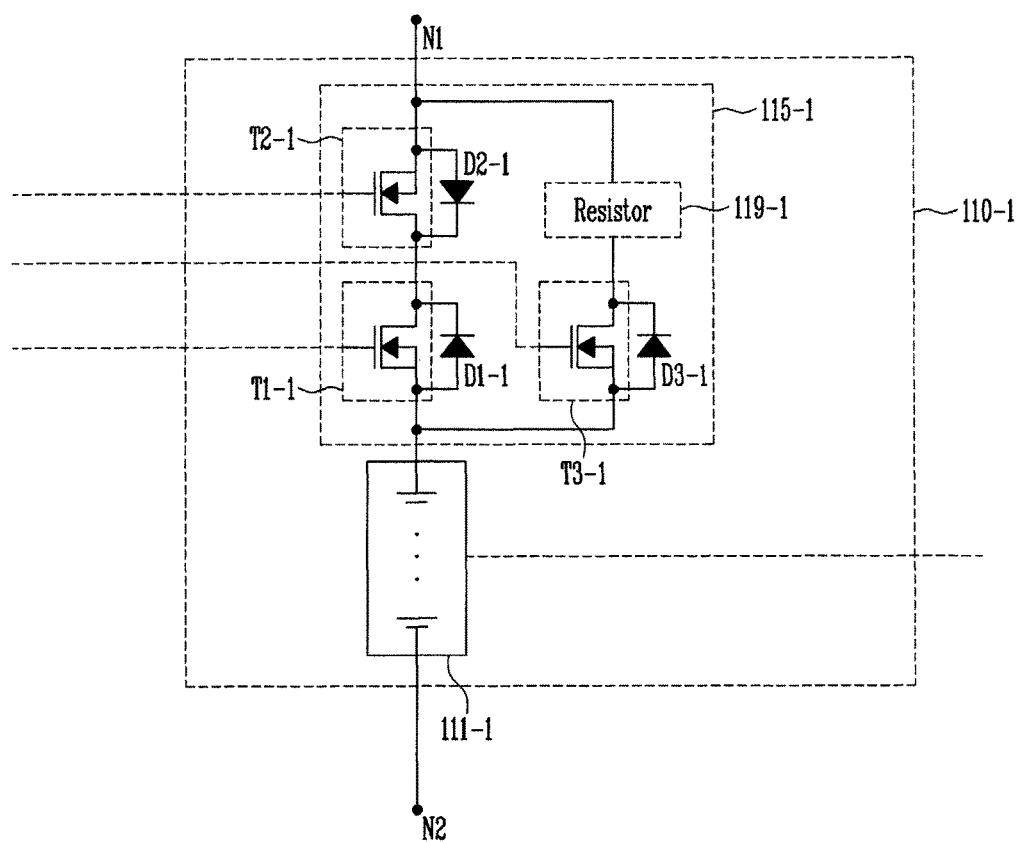
FIG. 2 is a diagram illustrating one of battery packs in the energy storage system shown in FIG. 1.

FIG. 2 is a diagram illustrating one of the battery packs in the energy storage system shown in FIG. 1.

Referring to FIG. 2, the first battery pack 110-1 includes batteries 111-1 and a transistor unit 115-1 electrically coupled between the batteries 111-1 and the first node N1.

The batteries 111-1 are supplied (or charged) with power from the external device, or provide (or discharge) power to the external device. A state of charge (SOC) of the batteries 111-1 is measured by the battery management system 130.

The transistor unit 115-1 includes a first transistor T1-1, a second transistor T2-1, a third transistor T3-1, a resistor 119-1, and first to third diodes D1-1 to D3-1. The first transistor T1-1 and the second transistor T2-1 are electrically coupled between the batteries 111-1 and the first node N1.

The first transistor T1-1 and the second transistor T2-1 are coupled in series to each other. The third transistor T3-1 and the resistor 119-1 are electrically coupled between the batteries 111-1 and the first node N1. The third transistor T3-1 and the resistor 119-1 are coupled in series to each other.

The first to third diodes D1-1 to D3-1 are coupled in parallel to the first to third transistors T1-1, T2-1, and T3-1, respectively.

When the first transistor T1-1 is turned on, a first current path, which reaches the batteries 111-1 from the first node N1 via the second diode D2-1 and the first transistor T1-1, may be formed. When the first transistor T1-1 is turned off, the first current path is cut off.

When the third transistor T3-1 is turned on, a third current path, which reaches the batteries 111-1 from the first node N1 via the resistor 119-1 and the third transistor T3-1, may be formed. When the third transistor T3-1 is turned off, the third current path is cut off. Because the resistor 119-1 exists on the third current path, the level of current flowing in the first current path is greater than that of current flowing in the third current path.

When the second transistor T2-1 is turned on, a second current path, which reaches the first node N1 from the batteries 111-1 via the first diode D1-1 and the second transistor T2-1, may be formed. When the second transistor T2-1 is turned off, the second current path is cut off.

According to the embodiment shown in FIG. 2, a SOC of the batteries 111-1 may be measured by the battery management system 130, and a control signal from the battery management system 130 may determine whether the first to third transistors T1-1 to T3-1 are turned on or turned off.

In FIG. 2, only the first battery pack 110-1 is illustrated, but the second and third battery packs 110-2 and 110-3 may have the same or substantially the same structure as the first battery pack 110-1. The battery packs 110 respectively include batteries 111-1, 111-2, and 111-3 (hereinafter, referred to as 111) and transistor units 115-1, 115-2, and 115-3 (hereinafter, referred to as 115). The transistor units 115 include first transistors T1-1, T1-2, and T1-3 (hereinafter, referred to as T1), second transistors T2-1, T2-2, and T2-3 (hereinafter, referred to as T2, third transistors T3-1, T3-2, and T3-3 (hereinafter, referred to as T3), and resistors 119-1, 119-2, and 119-3 (hereinafter, referred to as 119), respectively.

Figure 3:
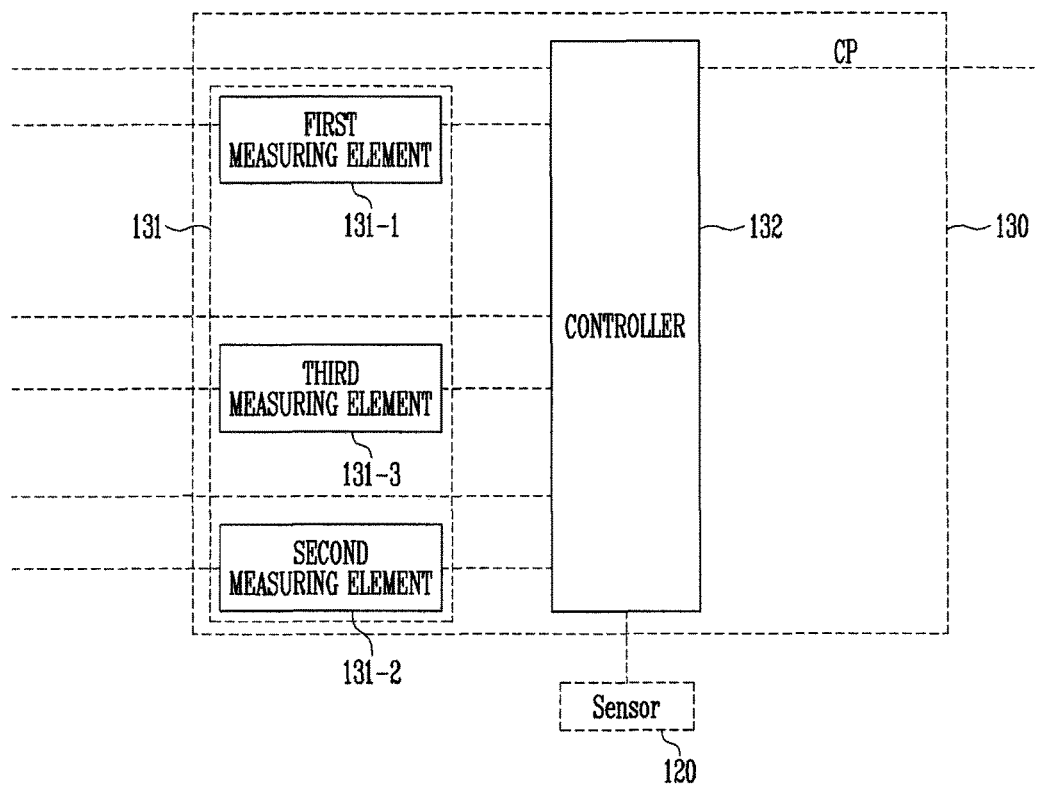
FIG. 3 is a diagram illustrating a battery management system in the energy storage system shown in FIG. 1.

FIG. 3 is a diagram illustrating the battery management system in the energy storage system shown in FIG. 1.

Referring to FIG. 3, the battery management system 130 includes a measuring unit 131 and a controller 132.

The measuring unit 131 measures the SOCs of the batteries 111, and may include first to third measuring elements (or measuring components) 131-1, 131-2, and 131-3 for respectively measuring the SOCs of the batteries 111. The measured SOCs are transmitted to the controller 132.

The controller 132 receives the SOCs of the batteries 111 from the measuring unit 131, and calculates a high value (e.g., a maximum value), a low value (e.g., a minimum value), an average value, and a difference value that may be determined by calculating a difference between the high value and the low value. The controller 132 controls the transistor units 115, based on the calculated high, low, average, and difference values. The average value may be any one of an arithmetical average, a geometrical average, a harmonic average, or a median value.

For convenience of illustration, it is assumed that the SOC of all of the batteries 111 is lower than a first reference SOC, or first predetermined SOC (e.g., 90%). When charging starts, the battery packs 110 are charged in a first mode. Until the SOC of the battery pack 110 corresponding to the high value increases to reach the first reference SOC, the first and second transistors T1 and T2 of all of the transistor units 115 are turned on, and the third transistors T3 of all of the transistor units 115 are turned off. While the battery packs 110 are charged in the first mode, the SOCs may be measured, and the high value may be calculated. The low value, the average value, and the difference value may be additionally calculated.

When the SOC of the battery pack 110 corresponding to the high value increases to reach the first reference SOC, the controller 132 generates a charge prohibition signal CP, and transmits the generated charge prohibition signal CP to the external device that is configured to charge the battery packs 110. Due to the transmission of the charge prohibition signal CP, the current flowing in the battery packs 110 from the external device is cut off for a set amount of time (e.g., a predetermined time, or a set amount of non-charging time, which may be, for example, 10 minutes), and only the batteries 111 are connected in parallel during the non-charging time. For convenience of illustration, it is assumed that the SOC of the first batteries 111-1 is highest, the SOC of the third batteries 111-3 is lowest, and the average value is lower than the SOC of the first batteries 111-1, and is higher than the SOC of the second and third batteries 111-2 and 111-3. During the non-charging time when no current flows to the battery packs 110 from the external device, current from the first battery pack 110-1 may flow into the second and third battery packs 110-2 and 110-3, and current from the second battery pack 110-2 may flow into the third battery pack 110-3. The sensor 120 measures a level of total current, and thus the sensor 120 can check whether the current flowing in the battery packs 110 from the external device is cut off. For the non-charging time, the difference value may decrease (i.e., the difference between the high value and the low value may decrease).

After the non-charging time elapses, the SOCs are measured, and a high value, a low value, an average value, and a difference value are calculated from the measured SOCs. When the difference value is greater than a reference difference value, or predetermined difference value (e.g., greater than 3%, such as an example when the high value SOC is 89% and the low value SOC is 85%), the battery packs 110 are charged in a second mode. In the case of the transistor unit 115-1 corresponding to the first batteries 111-1 having a SOC higher than the average value, the first transistor T1-1 is turned off, and the second and third transistors T2-1 and T3-1 are turned on. In the case of the transistor units 115-2 and 115-3 respectively corresponding to the second and third batteries 111-2 and 111-3, which have a SOC less than or equal to the average value, the first and second transistors T1-2, T1-3, T2-2, and T2-3 are turned on, and the third transistors T3-2 and T3-3 are turned off. When the difference value is less than or equal to the reference difference value, the battery packs 110 are charged in a third mode. While the battery packs 110 are charged in the third mode, the first and second transistors T1 and T2 of all of the transistor units 115 of the battery packs 110 are turned on, and the third transistors T3 are turned off.

When the SOC of the battery pack 110 corresponding to the high value is measured to be a second reference SOC (e.g., 100%), the battery packs 110 are charged in a fourth mode. For convenience of illustration, it is assumed that only the batteries 111-1 of the first battery pack 110-1 have the second reference SOC, and the batteries 111-2 and 111-3 of the second and third battery packs 110-2 and 110-3 have a SOC that is lower than the second reference SOC. The second reference SOC corresponds to a state in which a storage battery (e.g., the batteries 111 of the battery pack 110) is fully charged. Therefore, the first and third transistors T1-1 and T3-1 of the transistor unit 115-1 corresponding to the batteries 111-1 of the first battery pack 110-1 are turned off. That is, the charging of the battery pack 110 is stopped. The first transistors T1-2 and T1-3 of the transistor units 115-2 and 115-3 corresponding to the batteries 111-2 and 111-3 of the second and third battery packs 110-2 and 110-3 are turned off, and the second and third transistors T2-2, T2-3, T3-2, and T3-3 of the transistor units 115-2 and 115-3 corresponding to the batteries 111-2 and 111-3 of the second and third battery packs 110-2 and 110-3 are turned on. That is, the level of current charged in the other battery packs 110-2 and 110-3 also decreases (i.e., charging speed decreases). The second reference SOC may be higher than the first reference SOC.

The battery packs 110 are controlled by the controller 132 to be charged in the first to fourth modes. Therefore, the battery packs 110 may be charged while being controlled such that the difference value is less than or equal to the reference difference value. When the SOC of at least one of the battery packs 110 becomes the second reference SOC, the charging speed of battery packs having a SOC lower than the second reference SOC also decrease.

FIG. 4 is a flowchart illustrating a method of driving an energy storage system according to an embodiment of the present invention. Hereinafter, the method according to the embodiment of the present invention will be described with reference to FIGS. 1 to 4.

At S100, the battery packs 110 are charged in a first mode. The first and second transistors T1 and T2 of all of the transistor units 115 are turned on, and the third transistors T3 of all of the transistor units 115 are turned off. At S100, the SOCs of the batteries 111 may be measured, and a high value may be calculated from the measured SOCs of the batteries 111. The high value may be compared with a first reference SOC (e.g., a first predetermined SOC). Because the batteries 111 are charged at S100, the high value increases, and S100 is terminated when the high value reaches the first reference SOC.

At S200, the controller 132 generates a charge prohibition signal CP and transmits the generated charge prohibition signal CP to the external device. Due to the transmission of the charge prohibition signal CP, the battery packs 110 are not charged for the non-charging time (e.g., the predetermined time). The batteries 111 are connected in parallel for the non-charging time, and a difference value is decreased by S200 (e.g., due to charge sharing among the batteries 111 connected in parallel). When the non-charging time elapses, S200 is terminated.

At S300, the SOCs of the batteries 111 are measured. The measuring unit 131 measures a SOC of each of the batteries (e.g., each plurality of batteries) 111-1, 111-2, and 111-3 of the battery packs 110.

At S400, the controller 132 calculates an average value, a high value, a low value, and a difference value between the high value and the low value from the measured SOCs.

At S500, the controller 132 determines whether the calculated difference value is greater than a reference difference value/predetermined difference value (e.g., greater than 3%, such as an example when the high value SOC is 75% and the low value SOC is 71%). When the calculated difference value is greater than the reference difference value, S600 is performed. Otherwise, S700 is performed.

At S600, the battery packs 110 are charged in a second mode. For convenience of illustration, it is assumed that the SOC of the first batteries 111-1 is highest, the SOC of the third batteries 111-3 is lowest, and the average value is lower than the SOC of the first batteries 111-1, and higher than the SOC of the second and third batteries 111-2 and 111-3. In the case of the transistor unit 115-1 corresponding to the first batteries 111-1 (which have a SOC higher than the average value), the first transistor T1-1 is turned off, and the second and third transistors T2-1 and T3-1 are turned on. In the case of the transistor units 115-2 and 115-3 respectively corresponding to the second and third batteries 111-2 and 111-3 (which have a SOC less than or equal to the average value), the first and second transistors T1-2, T1-3, T2-2, and T2-3 are turned on, the third transistors T3-2 and T3-3 are turned off. After the battery packs 110 are charged for a set amount of time (e.g., a predetermined time, or a set amount of charging time), S800 is performed.

At S700, the battery packs 110 are charged in a third mode. While the battery packs 110 are charged in the third mode, the first and second transistors T1 and T2 of all of the transistor units 115 are turned on, and the third transistors T3 of all of the transistor units 115 are turned off. After the battery packs are charged for the charging time, S800 is performed.

At S800, the controller 132 compares whether the high value is greater than or equal to a second reference SOC (e.g., a second predetermined SOC). When the high value is the second reference SOC, S900 is performed. When the high value is lower than the second reference SOC, S300 is performed.

At S900, the battery packs 110 are charged in a fourth mode. For convenience of illustration, it is assumed that only the batteries 111-1 of the first battery pack 110-1 have the second reference SOC, and the batteries 111-2 and 111-3 of the second and third battery packs 110-2 and 110-3 have a SOC lower than the second reference SOC. The first and third transistors T1-1 and T3-1 of the transistor unit 115-1 corresponding to the batteries 111-1 are turned off, and the second transistor T2-1 of the transistor unit 115-1 corresponding to the batteries 111-1 is turned on. That is, the charging of the battery pack 110-1 is stopped. The first transistors T1-2 and T1-3 of the transistor units 115-2 and 115-3 corresponding to the batteries 111-2 and 111-3 are turned off, and the second and third transistors T2-2, T2-3, T3-2, and T3-3 of the transistor units 115-2 and 115-3 corresponding to the batteries 111-2 and 111-3 are turned on. In the fourth mode, the level of current flowing in the second and third battery packs 110-2 and 110-3 also decreases (i.e., charging speed decreases). Although S900 is performed, the measuring unit 131 can measure the SOCs of the batteries 111, and the controller 132 can calculate an average value, a high value, a low value, and a difference value between the high value and the low value from the measured SOCs.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, components, and/or elements described in connection with a particular embodiment may be used singly or in combination with features, characteristics, components, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. An energy storage system, comprising:
   a first terminal electrically connected to a first node;
   a second terminal electrically connected to a second node;
   battery packs each electrically coupled between the first and second nodes, the battery packs each being configured to receive power from a charging device through the first and second terminals; and
   a battery management system configured to control the battery packs,
   wherein each battery pack comprises:
      batteries; and
      a transistor unit including a first transistor, a second transistor, a third transistor, and a resistor, the transistor unit being electrically coupled between the batteries and the first node,
   wherein the battery management system comprises:
      a measuring unit for measuring a state of charge (SOC) of the batteries of each battery pack; and
      a controller configured to calculate a highest value, a lowest value, an average value, and a difference value between the highest value and the lowest value from the measured SOCs, and configured to control the transistor units of the battery packs, based on the calculated highest, lowest, average, and difference values,
   wherein the first transistor and the second transistor are electrically coupled in series with each other between the batteries and the first node,
   wherein the third transistor and the resistor are electrically coupled in series with each other and in parallel with the first transistor and the second transistor, such that discharging current flows through the resistor when the first and second transistors are turned off,
   wherein the first and third transistors are respectively configured to connect or disconnect charging current from the first node to the batteries via a first current path and a third current path,
   wherein the second transistor is configured to connect or disconnect discharging current from the batteries to the first node via a second current path,
   wherein, when current is flowing in both the first current path and the third current path, a level of current flowing in the first current path is greater than a level of current flowing in the third current path, and
   wherein a level of discharging current flowing through the second transistor when the first and third transistors are turned off is greater than a level of discharging current flowing through the resistor when the first and second transistors are turned off.

2. The energy storage system of claim 1, wherein the battery management system is configured to transmit first to third control signals respectively to gate electrodes of the first to third transistors.

3. The energy storage system of claim 2, wherein the controller is configured to generate a charge prohibition signal to stop charging of the energy storage system when the highest value is greater than or equal to a first reference SOC, and to send the charge prohibition signal to the charging device such that current does not flow into the energy storage system from the charging device,
   wherein a power of the batteries having a SOC of the highest value is transferred to the batteries having a SOC that is less than the highest value for a set amount of non-charging time when the energy storage system does not receive current from the charging device such that the difference value decreases, and
   wherein the controller is configured to generate a charge resumption signal to resume charging of the energy storage system after the set amount of non-charging time elapses, and to send the charge resumption signal to the charging device such that current flows into the energy storage system from the charging device.

4. The energy storage system of claim 3, wherein, when the difference value is greater than a reference difference value after the set amount of non-charging time elapses, the transistor unit corresponding to the batteries having a SOC that is higher than the average value is configured to be controlled differently from the transistor unit corresponding to the batteries having a SOC that is less than or equal to the average value,
   wherein, when the difference value is less than or equal to the reference difference value after the set amount of non-charging time elapses, all of the transistor units of the battery packs are configured to be controlled the same,
   wherein, when the highest value is greater than or equal to a second reference SOC, the transistor unit corresponding to the batteries having a SOC corresponding to the second reference SOC is configured to be controlled differently than the transistor units corresponding to the batteries having a SOC that is lower than the second reference SOC, and
   wherein the second reference SOC is higher than the first reference SOC.

5. The energy storage system of claim 3, wherein, when the difference value is greater than a reference difference value after the set amount of non-charging time elapses, the first transistor is turned off and the second and third transistors are turned on in the transistor unit corresponding to the batteries having a SOC that is higher than the average value, and the first and second transistors are turned on and the third transistor is turned off in the transistor unit corresponding to the batteries having a SOC that is less than or equal to the average value,
   wherein, when the difference value is less than or equal to the reference difference value after the set amount of non-charging time elapses, the first and second transistors of the battery packs are turned on and the third transistors of the battery packs are turned off in all of the transistor units, and
   wherein, when the highest value is greater than or equal to a second reference SOC, the first and third transistors are turned off and the second transistor is turned on in the transistor unit corresponding to the batteries having a SOC that is greater than or equal to the second reference SOC, and the first transistor is turned off and the second and third transistors are turned on in the transistor unit corresponding to the batteries having a SOC that is lower than the second reference SOC, and
   wherein the second reference SOC is higher than the first reference SOC.

6. A method of driving an energy storage system comprising: battery packs, each of the battery packs comprising batteries and a transistor unit electrically coupled between the batteries and a first node; and a battery management system configured to measure a state of charge (SOC) of each battery of the battery packs and configured to control the battery packs, the method comprising:
   charging the battery packs in a first mode until one of the battery packs having a highest SOC reaches a first reference SOC;

measuring SOCs of the battery packs;
calculating a highest value, a lowest value, an average value, and a difference value between the highest value and the lowest value from the measured SOCs;
charging the battery packs in a second mode when the difference value is greater than a reference difference value; and
charging the battery packs in a third mode when the difference value is less than or equal to the reference difference value,
wherein the transistor unit includes a first transistor, a second transistor, a third transistor, and a resistor,
wherein the first transistor and the second transistor are electrically coupled in series with each other between the batteries and the first node, such that discharging current flows through the resistor when the first and second transistors are turned off,
wherein the third transistor and the resistor are electrically coupled in series with each other and in parallel with the first transistor and the second transistor,
wherein the first and third transistors are respectively configured to connect or disconnect charging current from the first node to the batteries via a first current path and a third current path,
wherein the second transistor is configured to connect or disconnect discharging current from the batteries to the first node via a second current path,
wherein, when current is flowing in both the first current path and the third current path, a level of current flowing in the first current path is greater than a level of current flowing in the third current path, and
wherein a level of discharging current flowing through the second transistor when the first and third transistors are turned off is greater than a level of discharging current flowing through the resistor when the first and second transistors are turned off.

7. The method of claim 6, further comprising:
generating a charge prohibition signal to stop charging of the energy storage system when the highest value is greater than or equal to a first reference SOC;
sending the charge prohibition signal to a charging device such that current does not flow into the energy storage system from the charging device;
transferring a power of the batteries having a SOC of the highest value to the batteries having a SOC that is less than the highest value for a set amount of non- charging time when the energy storage system does not receive current from the charging device such that the difference value decreases;
generating a charge resumption signal to resume charging of the energy storage system after the set amount of non-charging time elapses; and
sending the charge resumption signal to the charging device such that current flows into the energy storage system from the charging device.

8. The method of claim 7, further comprising:
controlling the transistor units of ail of the battery packs the same during the charging the battery packs in the first mode;
controlling the transistor units of all of the battery packs the same during the charging the battery packs in the third mode after the set amount of non-charging time; and
controlling the transistor unit corresponding to the batteries having a SOC that is higher than the average value differently than the transistor unit corresponding to the batteries having a SOC that is less than or equal to the average value during the charging the battery packs in the second mode after the set amount of non-charging time.

9. The method of claim 7, further comprising:
turning on the first and second transistors and turning off the third transistors in all of the transistor units during the charging the battery packs in the first mode;
turning off the first transistor and turning on the second and third transistors in the transistor units corresponding to the batteries having a SOC that is higher than the average value, and turning on the first and second transistors and turning off the third transistor in the transistor units corresponding to the batteries having a SOC that is less than or equal to the average value, during the charging the battery packs in the second mode after the set amount of non-charging time; and
turning on the first and second transistors and turning off the third transistors in all of the transistor units during the charging the battery packs in the third mode after the set amount of non-charging time.

10. The method of claim 9, further comprising:
charging the battery packs in a fourth mode when the highest value is a second reference SOC; and
turning off the first and third transistors and turning on the second transistor in the transistor units corresponding to the batteries having the second reference SOC, and turning off the first transistor and turning on the second and third transistors in the transistor units corresponding to the batteries having the SOC that is lower than the second reference SOC, during the charging the battery packs in the fourth mode,
wherein the second reference SOC is higher than the first reference SOC.

* * * * *